United States Patent
Oouchi et al.

(10) Patent No.: US 11,925,980 B2
(45) Date of Patent: Mar. 12, 2024

(54) CERTAIN-SHAPED JOINT MATERIAL FOR HOT INSTALLATION

(71) Applicant: KROSAKIHARIMA CORPORATION, Fukuoka (JP)

(72) Inventors: Tatsuya Oouchi, Fukuoka (JP); Masaki Yamamoto, Fukuoka (JP)

(73) Assignee: KROSAKIHARIMA CORPORATION, Fukuoka (JP)

(*) Notice: Subject to any disclaimer, the term of this patent is extended or adjusted under 35 U.S.C. 154(b) by 563 days.

(21) Appl. No.: 17/282,059

(22) PCT Filed: Sep. 25, 2019

(86) PCT No.: PCT/JP2019/037465
§ 371 (c)(1),
(2) Date: Apr. 1, 2021

(87) PCT Pub. No.: WO2020/071190
PCT Pub. Date: Apr. 9, 2020

(65) Prior Publication Data
US 2021/0339312 A1    Nov. 4, 2021

(30) Foreign Application Priority Data
Oct. 5, 2018    (JP) ................. 2018-190429

(51) Int. Cl.
B22D 41/54    (2006.01)
B22D 41/50    (2006.01)
C04B 35/103    (2006.01)

(52) U.S. Cl.
CPC ........... *B22D 41/54* (2013.01); *B22D 41/502* (2013.01); *C04B 35/103* (2013.01);
(Continued)

(58) Field of Classification Search
CPC .......... C04B 35/103; C04B 2235/3218; C04B 2235/349; C04B 2235/425;
(Continued)

(56) References Cited

U.S. PATENT DOCUMENTS 4,956,013 A    9/1990    Motoki
5,098,504 A    3/1992    Motoki
(Continued)

FOREIGN PATENT DOCUMENTS

JP    5-163074 A    6/1993
JP    H06272191 A    9/1994
(Continued)

OTHER PUBLICATIONS

International Search Report and Written Opinion for PCT/JP2019/037465, dated Dec. 18, 2019.
(Continued)

*Primary Examiner* — Bryan D. Ripa
*Assistant Examiner* — Cameron K Miller
(74) *Attorney, Agent, or Firm* — Paul D. Bianco; Fleit Intellectual Property Law

(57) ABSTRACT

It is intended to suppress flaming and smoking due to combustion of combustible substances in a certain-shaped joint material, while maintaining hot sealability of the certain-shaped joint material. A certain-shaped joint material for hot installation is obtained by: adding organic additives to a blend in a combined amount of 26 mass % to 50 mass %, with respect to and in addition to 100 mass % of the blend, wherein the blend comprises 50 mass % to 90 mass % of gibbsite type aluminum hydroxide raw material, 1 mass % to 9 mass % of clay, and 9 mass % to 23 mass % of graphite, with the remainder mainly composed of an additional refractory raw material; and subjecting the resulting mixture to kneading, forming and drying.

9 Claims, 3 Drawing Sheets

Table 1

| Raw Material | | Blend A | Blend B | Blend C | Blend D | Blend E | Blend F | Blend G |
|---|---|---|---|---|---|---|---|---|
| Raw Material Name | Particle Size | (mass%) | (mass%) | (mass%) | (mass%) | (mass%) | (mass%) | (mass%) |
| Aluminum hydroxide | 1 μm to 0.25 mm | 90 | 82 | 79 | 76 | 68 | 50 | 50 |
| Alumina (aluminum oxide) | 0.25 mm or less | 0 | 0 | 0 | 0 | 0 | 40 | 18 |
| Clay | 0.2 mm or less | 1 | 9 | 4 | 1 | 9 | 1 | 9 |
| Graphite | 0.2 mm or more | 9 | 9 | 17 | 23 | 23 | 9 | 23 |

(52) U.S. Cl.
CPC .............. *C04B 2235/3218* (2013.01); *C04B 2235/349* (2013.01); *C04B 2235/425* (2013.01); *C04B 2235/5427* (2013.01); *C04B 2235/5436* (2013.01); *C04B 2235/5454* (2013.01)

(58) Field of Classification Search
CPC .... C04B 2235/5427; C04B 2235/5436; C04B 2235/5454
See application file for complete search history.

(56) References Cited

U.S. PATENT DOCUMENTS

| | | | |
|---|---|---|---|
| 10,682,696 | B2 | 6/2020 | Harima |
| 2019/0070661 | A1* | 3/2019 | Fukunaga .............. B22D 11/10 |

FOREIGN PATENT DOCUMENTS

| | | | |
|---|---|---|---|
| JP | 2000117404 | A | 4/2000 |
| JP | 2009-227538 | A | 10/2009 |
| JP | 2017144478 | A | 8/2017 |
| JP | 2018140406 | A | 9/2018 |
| WO | 88/02740 | A1 | 4/1988 |

OTHER PUBLICATIONS

International Preliminary Report dated Mar. 23, 2021 with Written Opinion for PCT/JP2019/037465, dated Sep. 25, 2019.

* cited by examiner

FIG. 1

Table 1

| Raw Material | | Blend A | Blend B | Blend C | Blend D | Blend E | Blend F | Blend G |
|---|---|---|---|---|---|---|---|---|
| Raw Material Name | Particle Size | (mass%) | (mass%) | (mass%) | (mass%) | (mass%) | (mass%) | (mass%) |
| Aluminum hydroxide | 1 μm to 0.25 mm | 90 | 82 | 79 | 76 | 68 | 50 | 50 |
| Alumina (aluminum oxide) | 0.25 mm or less | 0 | 0 | 0 | 0 | 0 | 40 | 18 |
| Clay | 0.2 mm or less | 1 | 9 | 4 | 1 | 9 | 1 | 9 |
| Graphite | 0.2 mm or more | 9 | 9 | 17 | 23 | 23 | 9 | 23 |

FIG. 2

Table 2

| Raw Material | | Blend H | Blend I | Blend J | Blend K | Blend L | Blend M |
|---|---|---|---|---|---|---|---|
| Raw Material Name | Particle Size | (mass%) | (mass%) | (mass%) | (mass%) | (mass%) | (mass%) |
| Aluminum hydroxide | 1 μm to 0.25 mm | 46 | 92 | 58 | 59 | 83 | 59 |
| Alumina (aluminum oxide) | 0.25 mm or less | 23 | 0 | 25 | 22 | 5 | 7 |
| Clay | 0.2 mm or less | 8 | 1 | 0 | 10 | 5 | 7 |
| Graphite | 0.2 mm or more | 23 | 7 | 17 | 9 | 7 | 26 |

Table 3

| | | Inventive Example 1 | Inventive Example 2 | Inventive Example 3 | Inventive Example 4 | Inventive Example 5 | Inventive Example 6 | Inventive Example 7 | Inventive Example 8 | Inventive Example 9 |
|---|---|---|---|---|---|---|---|---|---|---|
| Composition /mass% | Blend A | 100 | | | | | | | | |
| | Blend B | | 100 | | | | | | | |
| | Blend C | | | 100 | | | | | | |
| | Blend D | | | | 100 | | | | | |
| | Blend E | | | | | 100 | | | | |
| | Blend F | | | | | | 100 | | | |
| | Blend G | | | | | | | 100 | 100 | 100 |
| | Ethylene vinyl acetate-based emulsion | +25 | +35 | +40 | +30 | +35 | +40 | +45 | +30 | +45 |
| | Plasticizer: texanol | +1 | +3 | +4 | +2 | +3 | +2 | +5 | +1 | +5 |
| Evaluation | Formability of kneaded material | Good | Good | Good | Good | Good | Good | Good | Good | Good |
| | Shape retainability at normal temperature | 50~60 | 80~85 | 75~70 | 60~70 | 55~65 | 50~60 | 60~70 | 55~65 | 60~70 |
| | Combustion resistance | No flaming | No flaming | No flaming | No flaming | No flaming | No flaming | No flaming | No flaming | No flaming |
| | Hot sealability | Good | Good | Good | Good | Good | Good | Good | Good | Good |
| | Recovery time period (sec) | 120~140 | 170~200 | 190~220 | 130~150 | 140~160 | 100~120 | 130~150 | 140~160 | 130~150 |
| | Peelability after use | Good | Good | Good | Good | Good | Good | Good | Good | Good |
| | Comprehensive Evaluation | ○ | ◎ | ◎ | ◎ | ◎ | ◎ | ◎ | ◎ | ◎ |

FIG. 3

Table 4

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Composition /mass% | Blend H | 100 | | | | | | Gasket |
| | Blend I | | 100 | | | | | |
| | Blend J | | | 100 | | | | |
| | Blend K | | | | 100 | | | |
| | Blend L | | | | | 100 | | |
| | Blend M | | | | | | 100 | |
| | Ethylene vinyl acetate-based emulsion | +45 | +38 | +25 | +45 | +35 | +45 | |
| | Plasticizer: texanol | +4 | +4 | +2 | +5 | +3 | +5 | |
| Evaluation | Formability evaluatable of kneaded material | Good | Good | Non-formable | Non-formable | Good | Non-formable | — |
| | Shape retainability at normal temperature | 60~70 | 65~75 | - | - | 55~65 | - | Unmeasurable |
| | Combustion resistance | Flaming | No-flaming | - | - | No-flaming | - | No-flaming |
| | Hot sealability | Unevaluable | Good | Unevaluable | Unevaluable | Good | Unevaluable | NG |
| | Recovery time period (sec) | | 130-150 | | | 140-160 | | 2~4 |
| | Peelability after use | Unevaluable | Fusion-bonded | Unevaluable | Unevaluable | Fusion-bonded | Unevaluable | Good |
| | Comprehensive Evaluation | × | × | × | × | × | × | × |

FIG. 4

CERTAIN-SHAPED JOINT MATERIAL FOR HOT INSTALLATION

TECHNICAL FIELD

The present invention relates to a certain-shaped joint material to be installed between two joining parts such as nozzles in a facility for refining, continuous casting or the like of molten metal, so as to join them together, and more particularly to a certain-shaped joint material adapted for installation in a hot environment at a temperature of about 200° C. to about 1000° C.

BACKGROUND ART

For example, in a facility for continuous casting of steel, with a view to preventing intrusion of air and leakage of molten steel, a joint material such as a gasket or a certain-shaped joint material is used in a joining interface between a lower nozzle and a long nozzle or between a lower nozzle and an immersion nozzle.

The gasket is an alumina-silica based inorganic fiber molded body, and is mainly used for joining of a long nozzle requiring nozzle replacement every charge of continuous casting. This is because the gasket is capable of being reliably installed without flaming during installation in a hot environment, and further capable of avoiding fusion-bonding with the long nozzle during use, and exhibiting good peelability after use.

However, the gasket is a porous material having a porosity of 80% or more, so that sealing performance in hot environment (hereinafter referred to as "hot sealability") cannot be sufficiently obtained, and therefore there is a problem with quality of steel, protection of a jointing portion of each nozzle, durability of each nozzle, etc.

The certain-shaped joint material is obtained by mainly adding an organic (resin-based) binder, a plasticizer and a solvent to a blend mainly comprising various inorganic raw materials; and subjecting the resulting mixture to kneading, forming (shape forming) and drying. This certain-shaped joint material is a refractory joint material preliminarily processed to a shape close to that of a target joining portion, and particularly has higher hot sealability as compared to the gasket, so that it is widely used in a joining area between two nozzles.

As one example of such a certain-shaped joint material, the following Parent Document 1 discloses a certain-shaped joint material obtained by: adding an acrylic-based emulsion as a binder and texanol as a plasticizer to a raw material mixture composed of refractory raw materials, respectively, in an amount of 20 to 40 mass % and in an amount of 1 to 3 mass %, with respect to and in addition to 100 mass % of the raw material mixture; and subjecting the resulting mixture to kneading, forming and then drying.

CITATION LIST

Parent Document

Patent Document 1: JP-A 2009-227538

SUMMARY OF INVENTION

Technical Problem

In some cases, a certain-shaped joint material to be installed between two nozzles for continuous casting is installed in a high-temperature environment of about 200° C. to about 1000° C., such as in the interval of continuous casting charges of molten steel (e.g., in a period between charges of continuous casting, such as during exchange of a ladle), or in a period after preheating and before start of continuous casting.

In such a situation, since organic additives consisting mainly of a resin-based binder and a plasticizer contained in the certain-shaped joint material are combustible, the organic additives are likely to be gasified and combusted when the certain-shaped joint material is installed in the hot environment and rapidly raised to high temperature, thereby causing the occurrence of flaming (flame generation) and smoking (smoke generation). If flaming and smoking occurs, visibility of the joining area and the certain-shaped joint material will be deteriorated. If the visibility is deteriorated, the certain-shaped joint material becomes failing to be installed in a proper position, resulting in formation of a gap with respect to one or both of the nozzles, and deterioration in the sealability due to suction of atmospheric air via the gap, which leads to a situation where oxidization of the vicinity of the joining portion and an inner bore portion of the nozzle, oxidization of molten steel and the like are more likely to occur, or the risk of giving rise to molten steel leakage is increased.

Therefore, a problem to be solved by the present invention is to suppress flaming and smoking due to combustion of combustible substances in a certain-shaped joint material, while maintaining hot sealability of the certain-shaped joint material.

Solution to Technical Problem

The present invention provides a certain-shaped joint material described in the following sections 1 to 9.

1. A certain-shaped joint material for hot installation, which is obtained by: adding organic additives to a blend in a combined amount of 26 mass % to 50 mass %, with respect to and in addition to 100 mass % of the blend, wherein the blend comprises 50 mass % to 90 mass % of gibbsite type aluminum hydroxide raw material, 1 mass % to 9 mass % of clay, and 9 mass % to 23 mass % of graphite, with the remainder mainly composed of an additional refractory raw material; and subjecting the resulting mixture to kneading, forming and drying.
2. The certain-shaped joint material set forth in the section 1, wherein the gibbsite type aluminum hydroxide raw material has a particle size of 1 μm to 0.25 mm.
3. The certain-shaped joint material set forth in the section 1 or 2, wherein the additional refractory raw material in the remainder of the blend is one or more selected from the group consisting of an alumina raw material, a spinel raw material, a zircon raw material, a zirconia raw material, a magnesia raw material, and a silica raw material.
4. The certain-shaped joint material set forth in any one of the sections 1 to 3, wherein the graphite is flaky graphite having a particle size of 0.2 mm or more.
5. The certain-shaped joint material set forth in any one of the sections 1 to 4, wherein the organic additives comprise a binder and a plasticizer, wherein the binder and the plasticizer are added, respectively, in an amount of 25 mass % to 45 mass % and in an amount of 1 mass % to 5 mass %, with respect to and in addition to 100 mass % of the blend.

6. The certain-shaped joint material set forth in the section 5, wherein the binder is an ethylene vinyl acetate-based emulsion whose resin concentration is 40 mass % to 60 mass %.
7. The certain-shaped joint material set forth in the section 5 or 6, wherein the plasticizer is texanol monoisobutyrate or texanol diisobutyrate.
8. The certain-shaped joint material set forth in any one of the sections 1 to 7, wherein a temperature for the drying is 60° C. to 100° C.
9. The certain-shaped joint material set forth in any one of the sections 1 to 8, which is installed between two nozzles for continuous casting of steel, wherein at least one of the two nozzles has a temperature of 200° C. or more.

The feature of the present invention will be described below.

When heated to high temperature, aluminum hydroxide which is one type of metal hydroxide significantly absorbs heat, and simultaneously releases incombustible gas such as water molecules. Based on a cooling effect arising from the absorption of heat and the generation of water vapor resulting from decomposition in the above process, and an effect of blocking air or oxygen by a water vapor layer simultaneously formed around, combustion resistance is imparted to a certain-shaped joint material comprising organic additives.

Combustion of the certain-shaped joint material roughly follows the following process: supply of heat→generation of combustible gas→firing due to combination with oxygen in the air→spread of combustion→extinction of fire. In view of this process, factors contributing to suppression of combustion or flaming and smoking include (a) suppression of the release of the combustible gas, (b) dilution of the combustible gas, (c) suppression of supply of air or oxygen, or reduction of oxygen concentration, (d) suppression of temperature rise, or cooling, and (e) suppression of heat transfer.

Further, a quantitative balance between the organic additives which generates gas through combustion, and water vapor released from the aluminum hydroxide, and respective timings of the gas generation and the water vapor release, are important. That is, the following three respects are necessary to allow the aforementioned combustion resistance imparting process to efficiently operate.

(1) In terms of temperature, timing or the like, the thermal decomposition behavior of the aluminum hydroxide matches with the thermal decomposition behavior of the organic additives.
(2) Under the condition in the section (1), the aluminum hydroxide can release water vapor in a sufficient amount with respect to the amount of generation of combustible gas.
(3) The aluminum hydroxide is safe, and is industrially available at low cost and stably.

In the present invention, aluminum hydroxide is used as metal hydroxide. More specifically, among various types of aluminum hydroxides, gibbsite type aluminum hydroxide or gibbsite $(Al(OH)_3)$ is used.

In this gibbsite, the amount of a water vapor-forming component, i.e., (OH) component, is relatively large, and the total amount of heat absorption caused by a dehydration reaction is 2000 J/g which is the largest among metal hydroxides. Further, gibbsite has a dehydration initiation temperature of about 200° C. which is relatively low temperature among metal hydroxides, and exhibits a property, e.g., that it is unchanged and stable at about 200° C. or less, and, after dehydration, it is transformed into α-alumina having heat resistance against a temperature greater than a molten steel temperature With regard to gibbsite, its properties and combustion resistance mechanism will be further described.

According to a thermal decomposition property of gibbsite, there are three heat absorption peaks each of which corresponds to a respective one of the following dehydration reactions.

245° C.:
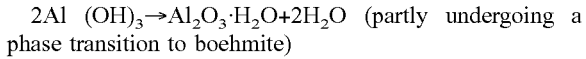
$2Al(OH)_3 \rightarrow Al_2O_3 \cdot H_2O + 2H_2O$ (partly undergoing a phase transition to boehmite)

320° C.:
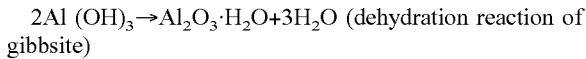
$2Al(OH)_3 \rightarrow Al_2O_3 \cdot H_2O + 3H_2O$ (dehydration reaction of gibbsite)

550° C.:
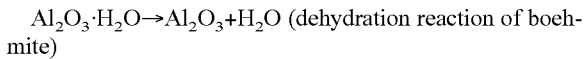
$Al_2O_3 \cdot H_2O \rightarrow Al_2O_3 + H_2O$ (dehydration reaction of boehmite)

The temperature of water vapor release caused by the above dehydration of gibbsite is close to 200° C. which is a combustion (thermal decomposition) initiation temperature of a dried remaining component of the organic additives (binder, plasticizer, etc.) in the certain-shaped joint material, so that it is possible to suppress combustion of combustible gas generated from the organic additives in the certain-shaped joint material, in a timely manner.

Further, the released water vapor has a function of reducing the temperature of the certain-shaped joint material.

In addition, the gibbsite type aluminum hydroxide is industrially available at a relatively low cost and stably.

As another industrially easily available aluminum hydroxide other than gibbsite, there is diaspore type aluminum hydroxide or diaspore (AlO(OH)). However, in diaspore, the amount of generation of water vapor is as small as ½ or less of that of gibbsite, the temperature of its decomposition, i.e., water vapor release, is about 500° C. which is higher than a temperature range in which combustible gas is generated from the certain-shaped joint material, so that a sufficient flaming and smoking suppression effect cannot be expected.

Further, although magnesium hydroxide may be used, its composition temperature is about 350° C. which is slightly higher than that of gibbsite, and its heat absorption amount is 380 cal/g which is smaller than that of gibbsite, so that the flaming and smoking suppression effect of magnesium hydroxide is inferior to that of gibbsite.

For the above reasons, it is desirable to use gibbsite to obtain a sufficient flaming and smoking suppression effect.

Meanwhile, in the field of building materials such as a combustion-resistant sheet material disclosed in JP-A H06-272191, it has heretofore been known to use aluminum hydroxide as a combustion resistance-imparting material or incombustibility-imparting material. However, such a material is not used under a condition that it is installed in a target region placed in a high-temperature environment, and produced without taking into account a quantitative balance between a gas generation or combustible component and water vapor released from the aluminum hydroxide, and respective timings of the gas generation and the water vapor release.

Effect of Invention

The certain-shaped joint material of the present invention can significantly reduce flaming and smoking during hot installation, while maintaining hot sealability.

Furthermore, even during installation in a continuous casting nozzle such as a long nozzle placed in a high-temperature environment, the certain-shaped joint material can be reliably installed in a given position without deterioration in visibility due to flaming and smoking. This makes it possible to maintain good hot sealability during operation (casting using the certain-shaped joint material), and suppressing damage due to oxidization of the vicinity of a joining portion and an inner bore portion of the continuous casting nozzle, and chemical wear caused by iron oxide, thereby preventing leakage of steel and further preventing deterioration in steel quality.

BRIEF DESCRIPTION OF THE DRAWINGS

FIG. 1 shows Table 1.
FIG. 2 shows Table 2.
FIG. 3 shows Table 3.
FIG. 4 shows Table 4.

DESCRIPTION OF EMBODIMENTS

A dehydration reaction of gibbsite type aluminum hydroxide (hereinafter referred to simply as "aluminum hydroxide") varies according to a particle size thereof. Specifically, if the particle size is less than 1 μm, it is difficult to develop a dehydration reaction conforming to the aforementioned requirements. Further, in order to ensure, particularly, fillability for providing sealability, among properties essential as the certain-shaped joint material, and from a viewpoint of ensuring permeability of combustible gas and generated water vapor, the particle size is preferably 1 μm to 0.25 mm.

The content rate of aluminum hydroxide in a blend except for organic additives (hereinafter referred to simply as "blend") is selected in the range of 50 mass % to 90 mass %.

If the content rate of aluminum hydroxide is less than 50 mass %, combustion resistance is deteriorated, thereby failing to solve the aforementioned problem during installation. If the content rate of aluminum hydroxide is greater than 90 mass %, the amount of clay relatively decreases, thereby leading to deterioration in shape retainability, flexibility or the like, and the amount of graphite also relatively decreases, thereby leading to deterioration in peelability during removal of the certain-shaped joint material.

Here, the content rate of aluminum hydroxide is determined while taking into account a balance with the amount of the organic additives (binder, plasticizer, etc.) necessary to obtain the essential properties of the certain-shaped joint material such as flexibility, plasticity, shape retainability (small temporal change), etc. That is, a specific content rate of aluminum hydroxide may be appropriately determined, according to individual operation conditions, specifically, the temperature of a nozzle at the time of installation of the certain-shaped joint material, or according to the amount of the organic additives, i.e., combustible substances, after being adjusted according to flexibility or the like required in individual operation conditions.

Clay is used to impart plasticity. Specifically, it is possible to use clay containing montmorillonite such as bentonite, and having plasticity.

The content rate of clay in the blend is set in the range of 1 mass % to 9 mass %. If the content rate of clay is less than 1 mass %, the plasticity of a kneaded material becomes insufficient, thereby leading to deterioration in formability. On the other hand, if the content rate of clay is greater than 9 mass %, forming becomes difficult, and the amount of addition of the organic additives needs to be increased so as to mitigate the difficulty, resulting in an increase in the content rate of combustible component, so that flaming and smoking during hot installation are more likely to occur or become significant.

Graphite is used for the purpose of preventing fusion-bonding with an installation surface of a nozzle or the like, and improving peelability from the installation surface after use, and the content rate thereof in the blend is set in the range of 9 mass % to 23 mass %.

If the content rate of graphite is less than 9 mass %, there arises a tendency toward fusion-bonding with a joining target, particularly, a refractory nozzle, and cause deterioration in the peelability, thereby posing a problem with de-installation of the nozzle, replacement work for the certain-shaped joint material, or the like. If the content rate of graphite is greater than 23 mass %, a kneaded material loses plasticity, and thereby has difficulty in forming, although there is no problem with the peelability. Moreover, the strength of the certain-shaped joint material during use decreases to cause deterioration in hot sealability, or elution into molten steel or physical wear is more likely to occur, so that there arises a problem with a joining portion protecting function Preferably, graphite to be used is flaky graphite having a particle size of 0.2 mm or more. Since this flaky graphite having a particle size of 0.2 mm or more has a large surface area as a continuous body, it is effective in preventing fusion-bonding among components in the blend or between each of them and the binder. The upper limit of the particle size of this flaky graphite is not particularly limited. However, industrially available flaky graphites generally have an upper-limit particle size of 0.5 mm or less.

The remainder of the blend is mainly composed of an additional refractory raw material. This additional refractory raw material in the remainder is preferably one or more selected from the group consisting of an alumina raw material, a spinel raw material, a zircon raw material, a zirconia raw material, and a magnesia raw material.

In the certain-shaped joint material, these refractory raw materials are less likely to develop a reaction for forming a low-melting point substance, with α-alumina resulting from transformation of aluminum hydroxide, and thereby can maintain stability of the certain-shaped joint material. These refractory raw materials in the remainder may include a refractory raw material having a particle size of greater than 0.25 mm, as long as the particle size is equal to or less than the thickness of a joint, and the amount of the refractory raw material is set to the extent that it does not hinder fillability of the certain-shaped joint material.

Here, the alumina raw material means a raw material consisting mainly of alumina such as corundum, sillimanite group minerals, or mullite, and the spinel raw material means a normal spinel of alumina and magnesia. Further, the zirconia raw material may be stabilized zirconia or may be unstabilized zirconia, irrespective of the type of stabilizing agent or the degree of stabilization, and the magnesia raw material means a raw material containing approximately 80 mass % or more of MgO component consisting mainly of periclase.

A silica raw material is likely to form mullite in cooperation with α-alumina when it is a high-purity product, so that it may also be used as a refractory raw material constituting the remainder of the blend.

However, when a large amount of impurities is contained in a foreign slag component or a silica raw material, a low-melting point substance is likely to be formed, thereby raising a problem such as chemical wear and physical wear.

Thus, the type or the like of refractory raw material may be appropriately selected depending on operation conditions such as an operating time period and an operating temperature. Further, in a case where the silica raw material is used in combination with another refractory raw material, it is preferably used in combination with a refractory raw material other than the magnesia raw material, because the combination of the silica raw material and the magnesia raw material is likely to form a low-melting point substance.

It should be noted that each of the refractory raw materials constituting the remainder of the blend may be used, regardless of artificial or natural, and regardless of a manufacturing process therefor.

In the certain-shaped joint material of the present invention, the organic additives are added to the blend in a combined amount of 26 mass % to 50 mass %, with respect to and in addition to 100 mass % of the blend. The organic additives consist mainly of a binder and a plasticizer.

As the binder, it is possible to use an ethylene vinyl acetate-based emulsion. As the ethylene vinyl acetate-based emulsion, it is possible to use a commercially-available ethylene vinyl acetate-based emulsion whose resin concentration is 40 mass % to 60 mass % (the constituent of the emulsion other than the resin content is mainly water). This resin content serves as a combustible substance. If the resin concentration is less than 40 mass %, a film formation mechanism during drying becomes insufficient, leading to difficulty in obtaining a joint material formed into a certain shape. If the resin concentration is greater than 60 mass %, there might arise undesirable situations where flaming and smoking during use become prominent, and explosive fracture occurs.

The viscosity of the ethylene vinyl acetate-based emulsion is preferably 100 to 500 cps at 25° C. If the viscosity is less than 100 cps, a kneaded material becomes insufficient in terms of plasticity, which can lead to difficulty in forming thereof due to breakage during forming. If the viscosity is greater than 500 cps, there might arise a situation where the excessively-high viscosity causes difficult to uniformly knead the mixture.

Further, the pH of the ethylene vinyl acetate-based emulsion is preferably about 4 to about 8. If the pH is less than about 4, the strong acidity highly exerts harmful effects on the human body, so that careful handling is required during kneading work, etc. If the pH is greater than about 8, the strong alkaline highly exerts harmful effects on the human body, so that careful handling is required during kneading work, etc., and a temporal change (curing phenomenon) of the kneaded material due to a reaction with the refractory raw materials is likely to increase. Therefore, it is preferable to use an ethylene vinyl acetate-based emulsion having a pH of about 4 to about 8 which is a stability range.

The amount of addition of the ethylene vinyl acetate-based emulsion is set in the range of 25 mass % to 45 mass %, with respect to and in addition to 100 mass % of the blend. If the amount of addition of the ethylene vinyl acetate-based emulsion is less than 25 mass % or greater than 45 mass %, a kneaded material can be obtained but has a problem with plasticity or shape retainability. As long as the amount of addition of the ethylene vinyl acetate-based emulsion is set in the range of 25 mass % to 45 mass %, a kneaded material having good formability with shape retainability can be obtained.

Although the plasticizer is generally intended to impart plasticity, it is used to mainly impart flexibility in terms of the intended purpose of the certain-shaped joint material. In the present invention, it is preferable to use a plasticizer other than a phthalic acid-based plasticizer. This is because the phthalic acid-based plasticizer involves safety and environmental problems.

As a plasticizer other than a phthalic acid-based plasticizer, it is preferable to use butyl-based texanol monoisobutyrate or texanol diisobutyrate (hereinafter referred to collectively as "texanol"), from a viewpoint of compatibility with the binder. The texanol has an ignition point which is as high as 390° C. Further, it does not violate the PRTR law and the VOC regulations, and there is no suspicion about an environmental hormone substance. Therefore, it is possible to provide a environmentally-friendly certain-shaped joint material.

The amount of addition of the plasticizer is set in the range of 1 mass % to 5 mass %, with respect to and in addition to 100 mass % of the blend. If the amount of addition of the plasticizer is less than 1 mass %, sufficient plasticity cannot be obtained. On the other hand, if the amount of addition of the plasticizer is greater than 5 mass %, an excess plasticizer remains in the joint material and converts over time, which can lead to a situation where a crack is formed in the joint material, after drying of a shaped body or before it is used, resulting in poor sealability.

The certain-shaped joint material of the present invention is obtained by adding the aforementioned organic additives to the aforementioned blend, and subjecting the resulting mixture to kneading, forming and drying. Here, the kneading may be performed using a mixer commonly used for kneading of a refractory material, such as a blade-type spiral mixer, planetary mixer, cooking mixer or Eirich mixer. During the kneading, pressure may be applied to the mixture as long as it does not break particles of the blend to cause a significant change in particle size and configuration of each raw material.

It should be understood that, for the sake of convenience for the kneading, a solvent such as water may be added to the blend and the organic additives. In this case, it is preferable to use a solvent which is vaporized and vanished during the drying.

The forming may be performed using a machine commonly used in forming of a refractory material, such as a uniaxial hydraulic forming machine. A forming pressure may be arbitrarily set according to individual operation conditions such as the shape of a product, and the density of the product depending on a pressure-bonding structure or strength.

The drying can be classified, by an operation mode, into a batch-type drying and a continuous-type drying; classified, by a heating mode, into a direct drying and an indirect drying; and classified, by a heat source, into hot-air drying, a combination drying using hot air and current-carrying directly through a wet body, infrared ray drying using an electric heater or a radiant tube, and a microwave drying.

In the present invention, among the above various types of drying, the drying of a shaped body is preferably performed by direct heating type hot-air drying using a relatively easily usable electrically-heated drying furnace, particularly, a (box-shaped or shelf chamber-shaped) batch-type electrically-heated drying furnace.

A drying temperature is preferably set in the range of 60° C. to 100° C. This is intended to more reliably obtain flexibility of a joint material formed as a film after drying the organic additives.

If the drying temperature is less than 60° C., this film formation becomes insufficient, and is more likely to become incomplete in the entire certain-shaped joint material, resulting in poor flexibility, which is likely to cause formation of crack during handling. On the other hand, if the drying temperature is greater than 100° C., the film formation becomes excessively strong, and the certain-shaped joint material tends to have poor flexibility because it is excessively hardened.

It should be noted that the above properties of the certain-shaped joint material are also influenced by a holding time period at the drying temperature or the like.

For example, when the certain-shaped joint material of the present invention is installed on a preheated refractory nozzle, the binder (ethylene vinyl acetate-based resin) is first melted and softened by heat of the refractory nozzle and thereby the certain-shaped joint material is softened. While this state is maintained, i.e., within about one minute, the certain-shaped joint material is compressed between and pressure-bonded to two nozzles to be joined together, so that it becomes possible to increase the density of the internal microstructure thereof, thereby ensuring sufficient hot sealability. Further, the certain-shaped joint material contains graphite. This makes it possible to prevent fusion-bonding with a joining surface of each nozzle during operation, and facilitate peeling of the certain-shaped joint material after use. Further, a reaction with molten steel, slag or the like, or chemical wear or the like, is less likely to occur.

EXAMPLES

Respective compositions of blends A to M used in Inventive Examples and Comparative Examples are shown in Tables 1 and 2. The purity of each raw material is 95% or more. Further, compositions and evaluation results of certain-shaped joint materials each produced using a respective one of the blends A to M are shown in Tables 3 and 4. As the ethylene vinyl acetate-based emulsion serving as a binder, an ethylene vinyl acetate-based emulsion having a resin concentration of 58 mass %, a viscosity of 200 cps and a pH of 5 was used. Further, as the texanol serving as a plasticizer, texanol monoisobutyrate, i.e., 2,2,4-trimethyl-1,3-pentanediol monoisobutyrate, was used.

Each evaluation shown in Tables 3 and 4 was performed in the following manner. The formability of a kneaded material was evaluated based on whether or not plasticity of the kneaded material is obtained and whether or not a desired shape is obtained after pressure-forming.

The shape retainability at normal temperature was evaluated based on the level of penetration of an indenter point from the surface of the joint material, measured using a spring type hardness tester described in JIS-K6301 "Physical Testing Methods for Vulcanized Rubber", and noted by an index score of 0 to 100. A larger value noted by the index score means a higher hardness of the joint material, and a smaller value noted by the index score means a higher softness of the joint material.

The combustion resistance was evaluated by installing the certain-shaped joint material on a refractory brick heated up to 800° C., and observing whether or not there is combustion or flaming, and smoking.

The hot sealability was evaluated by installing the certain-shaped joint material between two refractory bricks each heated up to 600° C., and measuring, as a recovery time period, a time period necessary to return from a state in which a space communicated with an atmospheric environment through the certain-shaped joint material is depressurized to 0.5 atm, to a state in which the space has an atmospheric pressure of 1 atm. A longer recovery time period means a higher hot sealability.

The peelability after use was evaluated by: placing the certain-shaped joint material on a refractory brick heated up to 800° C. (hereinafter referred to as "800° C. heated brick"); after the elapse of one minute, covering the certain-shaped joint material by another 800° C. heated brick to sandwich the certain-shaped joint material between the two bricks; putting the resulting laminate in a furnace at 1100° C. and applying a weight of 5 kg/cm$^2$ to the laminate for 15 minutes; and, after extracting the laminate from the furnace, checking easiness of peeling off of the brick.

Based on the above evaluations, each certain-shaped joint material was comprehensively evaluated by 3 grades of ⊚ (Good), ○ (Allowable) and × (NG), and a sample evaluated as ⊚ or ○ was determined to be an acceptable product.

First of all, Inventive Examples listed in Table 3 will be described.

In Inventive Example 1, a blend A comprising 90 mass % of aluminum hydroxide, 1 mass % of clay, and 9 mass % of graphite was prepared, and an ethylene vinyl acetate-based emulsion (binder) and texanol (plasticizer) were added to the blend A, in an amount of 25 mass % and in an amount of 1 mass %, respectively, with respect to and in addition to 100 mass % of the blend A. The resulting mixture was kneaded by a table-top mixer, and the resulting kneaded material was subjected to pressure-forming to obtain a sheet-shaped body having a thickness of 3 mm. Then, the sheet-shaped body was dried at 80° C. to produce a certain-shaped joint material through film formation of the emulsion by vaporization of water, and the certain-shaped joint material was subjected to the evaluations.

In evaluation of the combustion resistance, a good result was obtained without occurrence of flaming, and a measurement value measured by a spring type hardness tester described in JIS-K6301 "Physical Testing Methods for Vulcanized Rubber" was 50 to 60 which shows the presence of shape retainability at normal temperature. Further, the hot sealability and the peelability after use were also evaluated as good.

In Inventive Example 2, a blend B comprising 82 mass % of aluminum hydroxide, 9 mass % of clay, and 9 mass % of graphite was prepared, and the ethylene vinyl acetate-based emulsion (binder) and texanol (plasticizer) were added to the blend B, in an amount of 35 mass % and in an amount of 3 mass %, respectively, with respect to and in addition to 100 mass % of the blend B. Then, a certain-shaped joint material was produced in the same manner as that in Inventive Example 1, and subjected to the evaluations.

In evaluation of the combustion resistance, a good result was obtained without occurrence of flaming, and the shape retainability at normal temperature, the hot sealability and the peelability after use were also evaluated as good.

In Inventive Example 3, the ethylene vinyl acetate-based emulsion (binder) and texanol (plasticizer) were added to the same blend B as that in Inventive Example 2, in an amount of 40 mass % and in an amount of 4 mass %, respectively, with respect to and in addition to 100 mass % of the blend B. Then, a certain-shaped joint material was produced in the same manner as that in Inventive Example 1, and subjected to the evaluations.

In evaluation of the combustion resistance, a good result was obtained without occurrence of flaming, and the shape retainability at normal temperature, the hot sealability and the peelability after use were also evaluated as good.

In Inventive Example 4, a blend C comprising 79 mass % of aluminum hydroxide, 4 mass % of clay, and 17 mass % of graphite was prepared, and the ethylene vinyl acetate-based emulsion (binder) and texanol (plasticizer) were added to the blend C, in an amount of 30 mass % and in an amount of 2 mass %, respectively, with respect to and in addition to 100 mass % of the blend C. Then, a certain-shaped joint material was produced in the same manner as that in Inventive Example 1, and subjected to the evaluations.

In evaluation of the combustion resistance, a good result was obtained without occurrence of flaming, and the shape retainability at normal temperature, the hot sealability and the peelability after use were also evaluated as good.

In Inventive Example 5, the ethylene vinyl acetate-based emulsion (binder) and texanol (plasticizer) were added to the same blend C as that in Inventive Example 4, in an amount of 35 mass % and in an amount of 3 mass %, respectively, with respect to and in addition to 100 mass % of the blend C. Then, a certain-shaped joint material was produced in the same manner as that in Inventive Example 1, and subjected to the evaluations.

In evaluation of the combustion resistance, a good result was obtained without occurrence of flaming, and the shape retainability at normal temperature, the hot sealability and the peelability after use were also evaluated as good.

In Inventive Example 6, a blend D comprising 76 mass % of aluminum hydroxide, 1 mass % of clay, and 23 mass % of graphite was prepared, and the ethylene vinyl acetate-based emulsion (binder) and texanol (plasticizer) were added to the blend D, in an amount of 40 mass % and in an amount of 2 mass %, respectively, with respect to and in addition to 100 mass % of the blend D. Then, a certain-shaped joint material was produced in the same manner as that in Inventive Example 1, and subjected to the evaluations.

In evaluation of the combustion resistance, a good result was obtained without occurrence of flaming, and the shape retainability at normal temperature, the hot sealability and the peelability after use were also evaluated as good.

In Inventive Example 7, a blend E comprising 68 mass % of aluminum hydroxide, 9 mass % of clay, and 23 mass % of graphite was prepared, and the ethylene vinyl acetate-based emulsion (binder) and texanol (plasticizer) were added to the blend E, in an amount of 45 mass % and in an amount of 5 mass %, respectively, with respect to and in addition to 100 mass % of the blend E. Then, a certain-shaped joint material was produced in the same manner as that in Inventive Example 1, and subjected to the evaluations.

In evaluation of the combustion resistance, a good result was obtained without occurrence of flaming, and the shape retainability at normal temperature, the hot sealability and the peelability after use were also evaluated as good.

In Inventive Example 8, a blend F comprising 50 mass % of aluminum hydroxide, 40 mass % of alumina (aluminum oxide) raw material, 1 mass % of clay, and 9 mass % of graphite was prepared, and the ethylene vinyl acetate-based emulsion (binder) and texanol (plasticizer) were added to the blend F, in an amount of 30 mass % and in an amount of 1 mass %, respectively, with respect to and in addition to 100 mass % of the blend F. Then, a certain-shaped joint material was produced in the same manner as that in Inventive Example 1, and subjected to the evaluations.

In evaluation of the combustion resistance, a good result was obtained without occurrence of flaming, and the shape retainability at normal temperature, the hot sealability and the peelability after use were also evaluated as good.

In Inventive Example 9, a blend G comprising 50 mass % of aluminum hydroxide, 18 mass % of alumina (aluminum oxide) raw material, 9 mass % of clay, and 23 mass % of graphite was prepared, and the ethylene vinyl acetate-based emulsion (binder) and texanol (plasticizer) were added to the blend G, in an amount of 45 mass % and in an amount of 5 mass %, respectively, with respect to and in addition to 100 mass % of the blend G. Then, a certain-shaped joint material was produced in the same manner as that in Inventive Example 1, and subjected to the evaluations.

In evaluation of the combustion resistance, a good result was obtained without occurrence of flaming, and the shape retainability at normal temperature, the hot sealability and the peelability after use were also evaluated as good.

Next, Comparative Examples listed in Table 4 will be described.

In Comparative Example 1, a blend H containing aluminum hydroxide in an amount of 46 mass % which is less than the lower limit thereof in the present invention was prepared, and the ethylene vinyl acetate-based emulsion (binder) and texanol (plasticizer) were added to the blend H, in an amount of 45 mass % and in an amount of 4 mass %, respectively, with respect to and in addition to 100 mass % of the blend H. Then, the resulting mixture was kneaded by using a table-top mixer, in the same manner as that in Inventive Example 1. The formability of the resulting kneaded material was evaluated as good, and the shape retainability at normal temperature after drying was also evaluated as good. However, due to the excessively small content rate of aluminum hydroxide, flaming was observed. Therefore, it was impossible to proceed to the evaluations of the hot sealability and the peelability after use. As a result, the comprehensive evaluation was ×.

In Comparative Example 2, a blend I containing aluminum hydroxide in an amount of 92 mass % which is greater than the upper limit thereof in the present invention, and graphite in an amount of 7 mass % which is less than the lower limit thereof in the present invention was prepared, and the ethylene vinyl acetate-based emulsion (binder) and texanol (plasticizer) were added to the blend I, in an amount of 38 mass % and in an amount of 4 mass %, respectively, with respect to and in addition to 100 mass % of the blend I. Then, the resulting mixture was kneaded by using a table-top mixer, in the same manner as that in Inventive Example 1. The formability of the resulting kneaded material was evaluated as good, and the shape retainability at normal temperature after drying was also evaluated as good. However, due to the excessively large content rate of aluminum hydroxide, the content rate of graphite relatively excessively decreases, so that an obtained certain-shaped joint material was fusion-bonded to the refractory bricks, causing deterioration in the peelability after use.

In Comparative Example 3, a blend J containing no clay was prepared, and the ethylene vinyl acetate-based emulsion (binder) and texanol (plasticizer) were added to the blend J, in an amount of 25 mass % and in an amount of 2 mass %, respectively, with respect to and in addition to 100 mass % of the blend J. Then, the resulting mixture was kneaded in the same manner as that in Inventive Example 1. However, due to the absence of clay, the resulting kneaded material had no plasticity, and thereby could not be formed into a certain shape. Therefore, it was impossible to proceed to the evaluations of the hot sealability and the peelability after use. As a result, the comprehensive evaluation was ×.

In Comparative Example 4, a blend K containing clay in an amount of 10 mass % which is greater than the upper limit thereof in the present invention was prepared, and the ethylene vinyl acetate-based emulsion (binder) and texanol (plasticizer) were added to the blend K, in an amount of 45 mass % and in an amount of 5 mass %, respectively, with respect to and in addition to 100 mass % of the blend K. Then, the resulting mixture was kneaded in the same manner as that in Inventive Example 1. However, due to the excessively large content rate of clay, the resulting kneaded material was excessively hard, and thereby could not be formed into a certain shape. Therefore, it was impossible to proceed to the evaluations of the hot sealability, the peelability after use, etc. As a result, the comprehensive evaluation was ×.

In Comparative Example 5, a blend L containing graphite in an amount of 7 mass % which is less than the lower limit thereof in the present invention was prepared, and the ethylene vinyl acetate-based emulsion (binder) and texanol (plasticizer) were added to the blend L, in an amount of 35 mass % and in an amount of 3 mass %, respectively, with respect to and in addition to 100 mass % of the blend L. Then, the resulting mixture was kneaded in the same manner as that in Inventive Example 1. The formability of the resulting kneaded material was evaluated as good, and the shape retainability at normal temperature after drying was also evaluated as good. Further, no flaming was observed, and the hot sealability was evaluated as good. However, due to the excessively small content rate of graphite, an obtained certain-shaped joint material was fusion-bonded to the refractory bricks, causing deterioration in the peelability after use.

In Comparative Example 6, a blend M containing graphite in an amount of 26 mass % which is greater than the upper limit thereof in the present invention was prepared, and the ethylene vinyl acetate-based emulsion (binder) and texanol (plasticizer) were added to the blend M, in an amount of 45 mass % and in an amount of 5 mass %, respectively, with respect to and in addition to 100 mass % of the blend M. Then, the resulting mixture was kneaded in the same manner as that in Inventive Example 1. However, due to the excessively large content rate of graphite, the resulting kneaded material had no plasticity, and thereby could not be formed into a certain shape. Therefore, it was impossible to proceed to the evaluations of the hot sealability, the peelability after use, etc. As a result, the comprehensive evaluation was ×.

In Comparative Example 7, a commercially-available gasket currently used as a joint material between a lower nozzle and a long nozzle was subjected to the same evaluations.

As shown in the evaluation result in Table 4, although the gasket was not fusion-bonded to the refractory bricks, it had poor hot sealability. As a result, it was comprehensively evaluated to be unsuitable as a joint material. This is the same result as that in an actual furnace.

As above, in Inventive Examples 1 to 9 each falling within the scope of the present invention, it is possible to avoid flaming and smoking, and fusion-bonding with nozzles to be joined together, while maintaining the hot sealability. This makes it possible to easily and reliably perform work for replacement of a nozzle and a certain-shaped joint material. In addition, since sealability and protection of a joining portion in a hot environment can be maintained, it is possible to prevent entrainment of ambient air (air) during operation, and obtain high-quality steel.

The invention claimed is:

1. A certain-shaped joint material for hot installation, which is obtained by: adding organic additives to a blend in a combined amount of 26 mass % to 50 mass %, with respect to and in addition to 100 mass % of the blend, wherein the blend comprises 50 mass % to 90 mass % of gibbsite type aluminum hydroxide raw material, 1 mass % to 9 mass % of clay, and 9 mass % to 23 mass % of graphite, with the remainder mainly composed of an additional refractory raw material; and subjecting the resulting mixture to kneading, forming and drying.

2. The certain-shaped joint material as recited in claim 1, wherein the aluminum hydroxide raw material has a particle size of 1 µm to 0.25 mm.

3. The certain-shaped joint material as recited in claim 1, wherein the additional refractory raw material in the remainder of the blend is one or more selected from the group consisting of an alumina raw material, a spinel raw material, a zircon raw material, a zirconia raw material, a magnesia raw material, and a silica raw material.

4. The certain-shaped joint material as recited in claim 1, wherein the graphite is flaky graphite having a particle size of 0.2 mm or more.

5. The certain-shaped joint material as recited in claim 1, wherein the organic additives comprise a binder and a plasticizer, wherein the binder and the plasticizer are added, respectively, in an amount of 25 mass % to 45 mass % and in an amount of 1 mass % to 5 mass %, with respect to and in addition to 100 mass % of the blend.

6. The certain-shaped joint material as recited in claim 5, wherein the binder is an ethylene vinyl acetate-based emulsion whose resin concentration is 40 mass % to 60 mass %.

7. The certain-shaped joint material as recited in claim 5, wherein the plasticizer is 2,2,4-trimethyl-1,3-pentanediol monoisobutyrate or 2,2,4-trimethyl-1,3-pentanediol diisobutyrate.

8. The certain-shaped joint material as recited in claim 1, wherein a temperature for the drying is 60° C. to 100° C.

9. The certain-shaped joint material as recited in claim 1, which is installed between two nozzles for continuous casting of steel, wherein at least one of the two nozzles has a temperature of 200° C. or more.

\* \* \* \* \*